(12) United States Patent
Inoue et al.

(10) Patent No.: US 7,537,366 B2
(45) Date of Patent: May 26, 2009

(54) VEHICULAR LAMP

(75) Inventors: Takashi Inoue, Shizuoka (JP); Seiichiro Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 69 days.

(21) Appl. No.: 11/484,315

(22) Filed: Jul. 11, 2006

(65) Prior Publication Data
US 2007/0025105 A1 Feb. 1, 2007

(30) Foreign Application Priority Data
Jul. 28, 2005 (JP) ............................. 2005-219302

(51) Int. Cl.
*B60Q 3/00* (2006.01)
*F21V 7/20* (2006.01)
*F21V 29/00* (2006.01)

(52) U.S. Cl. ..................... 362/547; 362/345; 362/373; 362/294; 362/544

(58) Field of Classification Search ................ 362/547, 362/345, 373, 544, 293
See application file for complete search history.

(56) References Cited

U.S. PATENT DOCUMENTS

| | | | | |
|---|---|---|---|---|
| 4,729,076 A | * | 3/1988 | Masami et al. | 362/235 |
| 4,779,167 A | * | 10/1988 | Nelson | 362/547 |
| 5,219,444 A | * | 6/1993 | Chiaramonte et al. | 362/464 |
| 7,210,832 B2 | * | 5/2007 | Huang | 362/547 |
| 2004/0120148 A1 | * | 6/2004 | Morris et al. | 362/264 |
| 2004/0202007 A1 | * | 10/2004 | Yagi et al. | 362/545 |
| 2004/0213016 A1 | * | 10/2004 | Rice | 362/547 |
| 2005/0180113 A1 | * | 8/2005 | Shirakami et al. | 361/704 |
| 2005/0231983 A1 | * | 10/2005 | Dahm | 362/800 |
| 2006/0076572 A1 | * | 4/2006 | Huber et al. | 257/99 |
| 2006/0092639 A1 | * | 5/2006 | Livesay et al. | 362/294 |
| 2006/0215416 A1 | * | 9/2006 | Lucas et al. | 362/545 |
| 2008/0247177 A1 | * | 10/2008 | Tanaka et al. | 362/373 |

* cited by examiner

*Primary Examiner*—Jong-Suk (James) Lee
*Assistant Examiner*—David J Makiya
(74) *Attorney, Agent, or Firm*—Osha • Liang LLP (57) ABSTRACT

A metal bracket that supports a plurality of lamp units is configured so as to be housed in the lamp chamber and to be tiltably supported by a lamp body. In this situation, a portion of the lamp body is configured so as to be a heat sink. The heat sink and the metal bracket are connected to each other by a flexible heat pipe. With this arrangement, the heat that is generated by light emitting elements included in lamp units is allowed to move to the heat sink via the metal bracket and the flexible heat pipe, and is thereby released into the space that is outside the lamp chamber. Further, due to the transformation of the flexible heat pipe having flexibility, even when the metal bracket is tilted, it is possible to easily maintain the water-proof function of the lamp without hindering the movement of the metal bracket.

11 Claims, 9 Drawing Sheets

VEHICULAR LAMP

BACKGROUND OF INVENTION

1. Field of the Invention

The present invention relates to a vehicular lamp including a plurality of lamp units that use light emitting elements as light sources.

2. Related Art

In a vehicular lamp, such as a headlamp, a plurality of lamp units are housed inside a lamp chamber that is formed by a lamp body and a translucent cover attached to the front-end opening of the lamp body. Recently, in vehicular lamps, a configuration in which light emitting elements such as light-emitting diodes are used as light sources of the lamp units have been increasingly employed.

Patent Document 1 discloses a vehicular lamp including a plurality of lamp units that use light emitting elements as light sources and having a configuration in which a metal bracket that supports the plurality of lamp units is tiltably supported by the lamp body.

[Patent Document 1]

U.S. Patent Application Publication No. 2004/0202007

As disclosed in Patent Document 1, with the configuration in which the plurality of lamp units are supported by the metal bracket, it is possible to allow the heat generated by the light emitting elements in the lamp units to move to the metal bracket, which has a large heat capacity, due to thermal conduction. Thus, it is possible to inhibit the temperature rise in the light emitting elements. However, a problem remains where the metal bracket is not able to release the heat conducted from the light emitting elements sufficiently because the metal bracket is housed inside the lamp chamber.

To cope with this problem, when the metal bracket is arranged so as to be exposed to the space outside the lamp chamber, it is possible to improve its heat releasing performance. However, when the metal bracket is tilted, it is not easy to maintain the water-proof function of the lamp without hindering the movement of the metal bracket. Thus, the problem arises of the configuration of the lamp becoming complicated.

SUMMARY OF INVENTION

One or more embodiments of the present invention provide a vehicular lamp that includes a plurality of lamp units using light emitting elements as light sources and that is able to improve the heat releasing performance of the lamp without making the configuration of the lamp complicated.

One or more embodiments of the present invention comprise a predetermined member that has flexibility and has high thermal conductivity.

One or more embodiments of the present invention provide a vehicular lamp in which a plurality of lamp units that use light emitting elements as light sources and a metal bracket that supports the plurality of lamp units are housed in a lamp chamber formed by a lamp body and a translucent cover that is attached to a front-end opening of the lamp body, while the metal bracket is tiltably supported by the lamp body, wherein one of a portion of the lamp body and a portion of the translucent cover is configured with a metal member, and the metal member and the metal bracket are connected to each other by a member having flexibility and high thermal conductivity.

The type of the "vehicular lamp" is not particularly limited. For example, it is acceptable to use any one of head lamps, fog lamps, cornering lamps, tail lamps, stop lamps, backup lamps, turn signal lamps, daytime running lamps, as the vehicular lamp.

The type of the "light emitting elements" is not particularly limited. For example, it is acceptable to use light emitting diodes or laser diodes as the light emitting elements. In addition, the specific configuration of the "light emitting elements" is not particularly limited. For example, each of the light emitting elements may have a single light emitting chip mounted thereon or may have a plurality of light emitting chips mounted thereon.

The specific configuration of the "metal bracket" is not particularly limited as long as it is configured so as to support the plurality of lamp units.

The quantity of the "plurality of lamp units" and the specific configuration of the "lamp units" are not particularly limited.

The specific configuration of the "metal member" and the positional arrangement of "metal member" with respect to the lamp body and the translucent cover are not particularly limited, as long as the "metal member" is a member that is made of metal and is configured so as to be one of a portion of the lamp body and a portion of the translucent cover.

The specific configuration, such as the material and the shape, of the "member having high thermal conductivity" is not particularly limited, as long as the "member having high thermal conductivity" has high thermal conductivity that is equal to or higher than that of metal and also has flexibility. In this situation, as for the material of which the "member having high thermal conductivity" is made, for example, metal such as copper, aluminum, or the like, or a special carbon fiber (e.g. "PGS Graphite Sheet" [a trade name] manufactured by Matsushita Electric Industrial Co., Ltd.) may be used. As for the shape of the "member having high thermal conductivity", for example, it is acceptable to use one that has a band shape or a string shape. Further, the connection means for connecting the "member having high thermal conductivity" to the metal member and the metal bracket is not particularly limited, either. For example, it is acceptable to use connecting means such as adhesion, welding, fastening with screws, or the like.

The expression "metal" as in the "metal bracket" and the "metal member" refers to substances including a substance made of one kind of metal, and also, a substance made of alloy that contains two or more kinds of metal.

As mentioned in the description of the configurations above, one or more embodiments of the present invention provide a vehicular lamp in which the plurality of lamp units that use the light emitting elements as the light sources and the metal bracket that supports the plurality of lamp units are housed in the lamp chamber formed by the lamp body and the translucent cover that is attached to the front-end opening of the lamp body, while the metal bracket is tiltably supported by the lamp body. In one or more such configurations, one of a portion of the lamp body and a portion of the translucent cover is configured with the metal member. Also, the metal member and the metal bracket are connected to each other by the member having flexibility and thermal conductivity. Thus, it is possible to achieve the effects below.

When the lamp units are lit, the heat generated by the light emitting elements moves to the metal bracket, which has a large heat capacity, due to thermal conduction. Also, the heat further moves to the metal member via the member having high thermal conductivity. In this situation, the metal member is configured so as to be one of a portion of the lamp body and a portion of the translucent cover, each of which is a member that is exposed to the space outside the lamp chamber. Thus, the heat that has been conducted to the metal member is released into the space that is outside the lamp chamber. Accordingly, it is possible to improve the heat releasing performance of the lamp.

Further, the member having high thermal conductivity that connects the metal member and the metal bracket to each other has flexibility. Thus, even when the metal bracket is tilted, it is possible to easily maintain the water-proof function of the lamp, without hindering the movement of the metal bracket. Accordingly, it is possible to prevent the configuration of the lamp from being complicated.

As explained above, according to one or more embodiments of the present invention, it is possible to improve the heat releasing performance of the vehicular lamp that includes the plurality of lamp units that use the light emitting elements as the light sources, without making the configuration of the vehicular lamp complicated. Thus, it is possible to effectively inhibit the temperature rise in the light emitting elements that are included in the lamp units. It is also possible to effectively inhibit a reduction in the light flux from the light sources and to effectively inhibit changes in the light emission colors.

In accordance with one or more embodiments of the present invention, the member having high thermal conductivity may be configured with a flexible heat pipe. With this arrangement, the thermal conduction from the metal bracket to the metal member is efficiently achieved, due to the thermal transport function of the flexible heat pipe. In this case, the specific configuration of the flexible heat pipe is not particularly limited. For example, it is acceptable to use one that has a band shape (e.g. pera-flex [trade name] manufactured by Furukawa Electric Co., Ltd.) or one that has a string shape.

In accordance with one or more embodiments of the present invention, the lamp body may be configured so as to include a lamp main body having an opening in a rear face wall thereof; and the metal member attached to the opening in the lamp main body. Also, the metal member may be configured so as to include a panel portion that is arranged so as to close up the opening in the lamp main body and a plurality of heat releasing fins that extend rearward from the panel portion. With these arrangements, it is possible to efficiently release the heat that has been conducted to the metal member into the space that is outside the lamp chamber.

In accordance with one or more embodiments of the present invention, the metal member may be configured with a metal wire that is embedded in the translucent cover in a predetermined wiring pattern. With this arrangement, it is possible to make the space outside the lamp chamber, into which the heat that has been conducted to the metal member is released, an outside space of the vehicle body. Thus, it is possible to further improve the heat releasing performance of the lamp. In addition, it is also possible to expect that the heat supplied by the metal wire produces an antifogging effect for the fogging that may occur on the internal surface of the translucent cover and a snow melting effect for snow that may be stuck on the external surface of the translucent cover.

In this case, the two end portions of the metal wire may extend out of the translucent cover for predetermined lengths, and the member having high thermal conductivity may be configured with the pair of extending portions of the metal wire. With this configuration, it is possible to reduce the number of parts being used. Accordingly, it is possible to further simplify the lamp.

In accordance with one or more embodiments of the present invention, the light emitting element in the lamp units may be attached directly to the metal bracket. Therefore, it is possible to allow the heat generated by the light emitting elements to move to the metal bracket promptly. As a result, it is possible to further enhance the heat releasing performance of the light emitting elements. Other aspects and advantages of the invention will be apparent from the following description and the appended claims.

DETAILED DESCRIPTION

Hereinafter, embodiments of the present invention will be described with reference to the drawings.

First of all, a first embodiment of the present invention will be explained.

Figure 1:
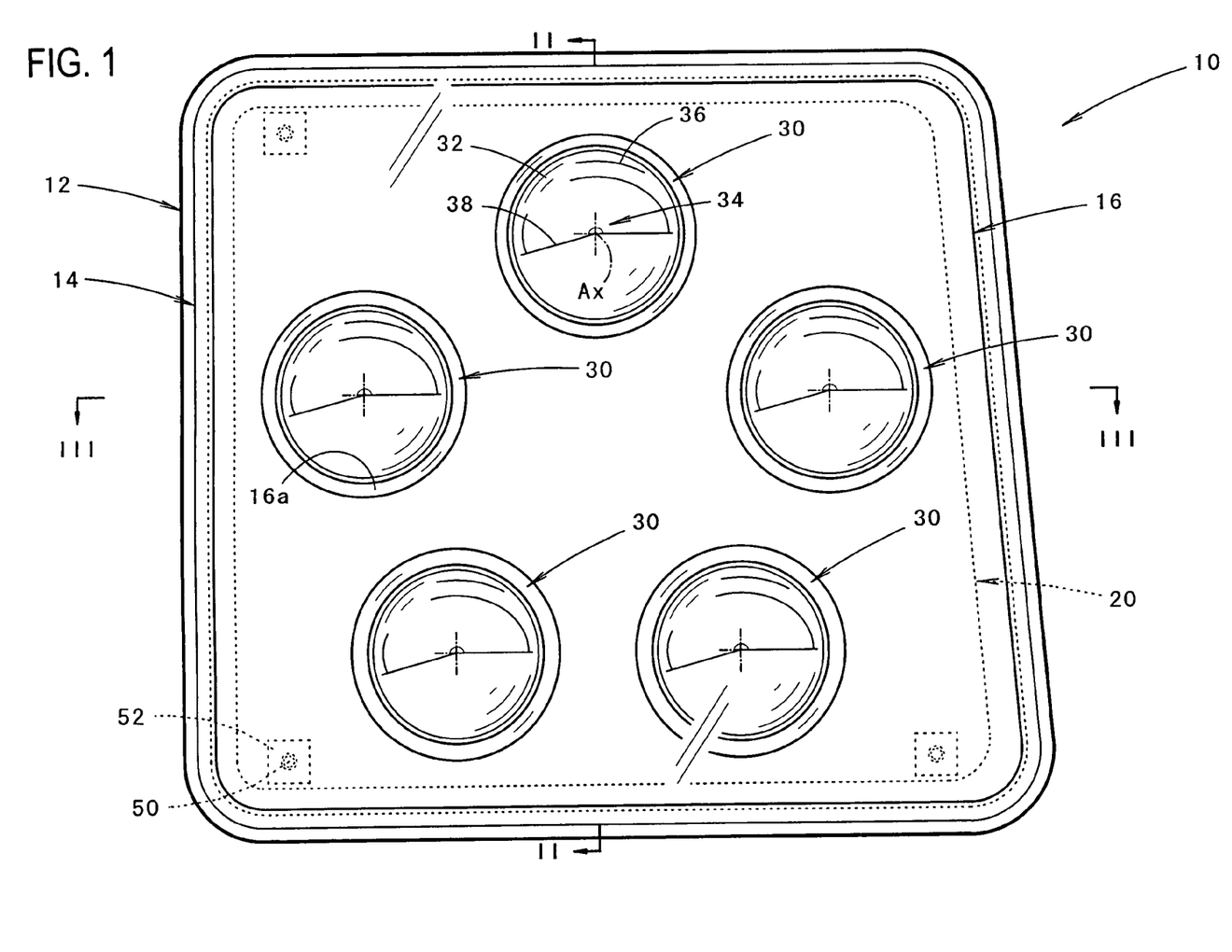
FIG. 1 is a front view of a vehicular lamp according to a first embodiment of the present invention.
Figure 2:
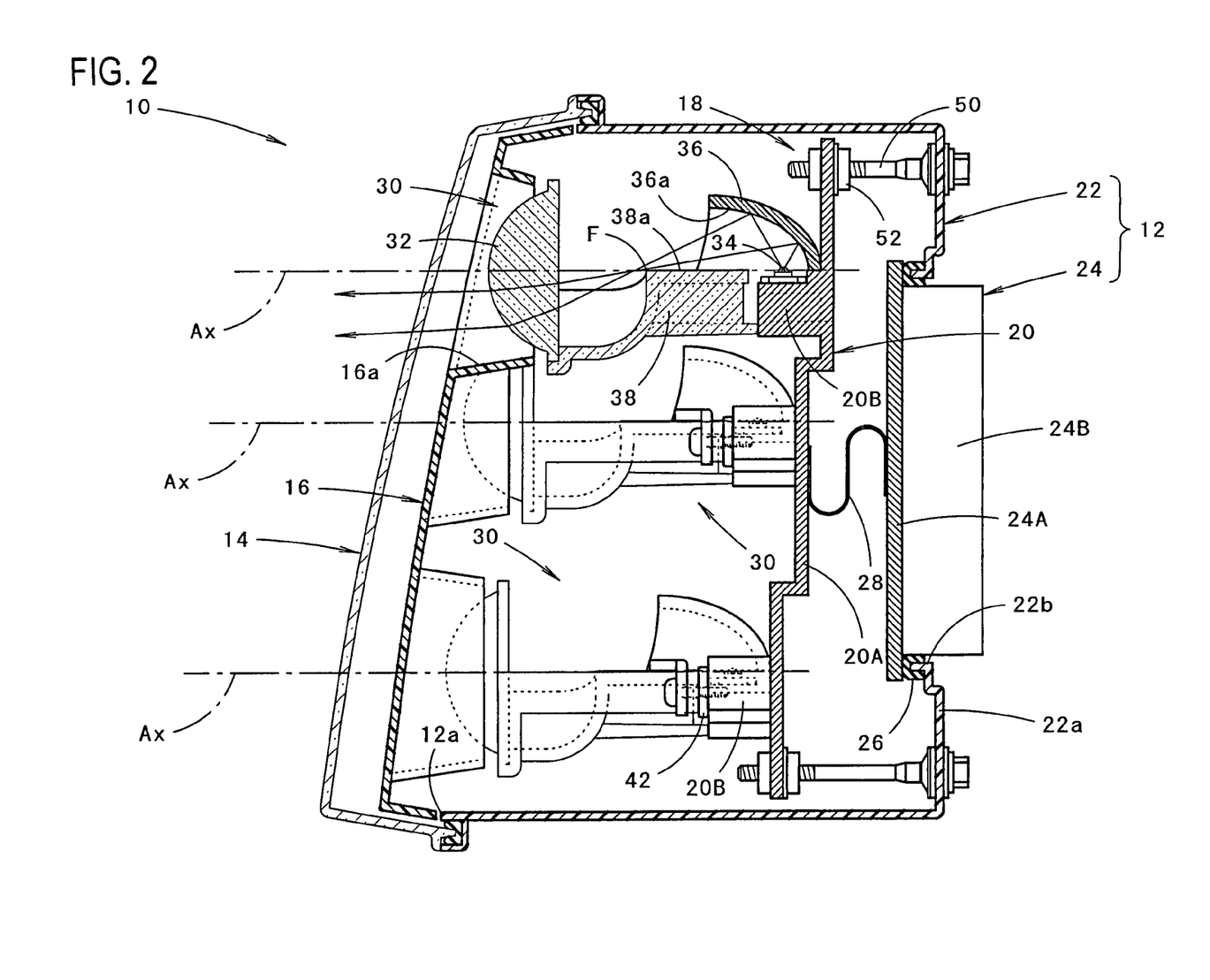
FIG. 2 is a cross-sectional view taken along line II-II in FIG. 1.
Figure 3:
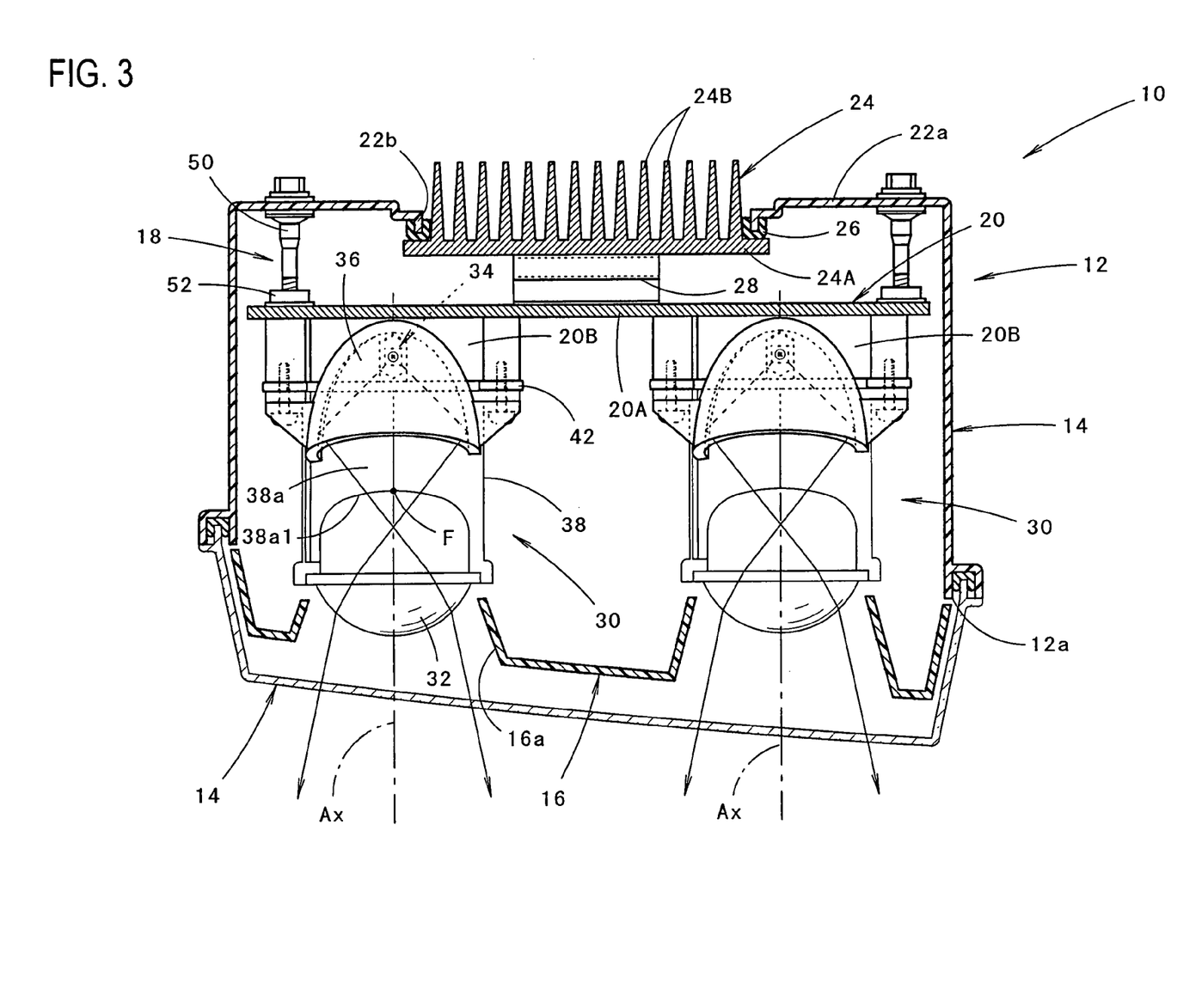
FIG. 3 is a cross-sectional view taken along line III-III in FIG. 1.

FIG. 1 is a front view of a vehicular lamp according to the present embodiment. FIG. 2 is a cross-sectional view taken along line II-II in FIG. 1. FIG. 3 is a cross-sectional view taken along line III-III in FIG. 1.

As shown in these drawings, a vehicular lamp 10 according to the present embodiment is a head lamp that is provided on a front-end right side portion of a vehicle body. The vehicular lamp 10 has a configuration in which five lamp units 30 are housed inside a lamp chamber formed by a lamp body 12 and a translucent cover 14 that is in a plain configuration, is made of a transparent resin, and is attached to a front-end opening 12a of the lamp body 12. The vehicular lamp 10 forms a low-beam distribution pattern with the light radiations from the five lamp units 30.

Within the lamp chamber, an inner panel 16 is provided to be positioned along the translucent cover 14. The inner panel 16 has, at the positions that correspond to the lamp units 30, openings 16a, each of which is in a cylindrical shape and surrounds the corresponding position.

Each of the five lamp units 30 is configured as a projector-type lamp unit. The five lamp units 30 are supported by a metal bracket 20, which is used in common among the five lamp units 30.

The metal bracket 20 is supported, via an aiming mechanism 18, by the lamp body 12 in such a manner that the metal bracket 20 is tiltable in the up-and-down direction and in the right-and-left direction.

The aiming mechanism 18 is configured so as to include three aiming screws 50. The basal ends of the aiming screws 50 are rotatably supported by the lamp body 12. The tip ends of the aiming screws 50 are engaged and connected to the metal bracket 20 via an aiming nut 52.

In the aiming mechanism 18, predetermined ones of the aiming screws 50 are rotated with a screwdriver appropriately, so that the metal bracket 20 is tilted in the up-and-down direction or in the right-and-left direction. Thus, the optical axis adjustments of the five lamp units 30 are performed in a collective manner.

Figure 4:
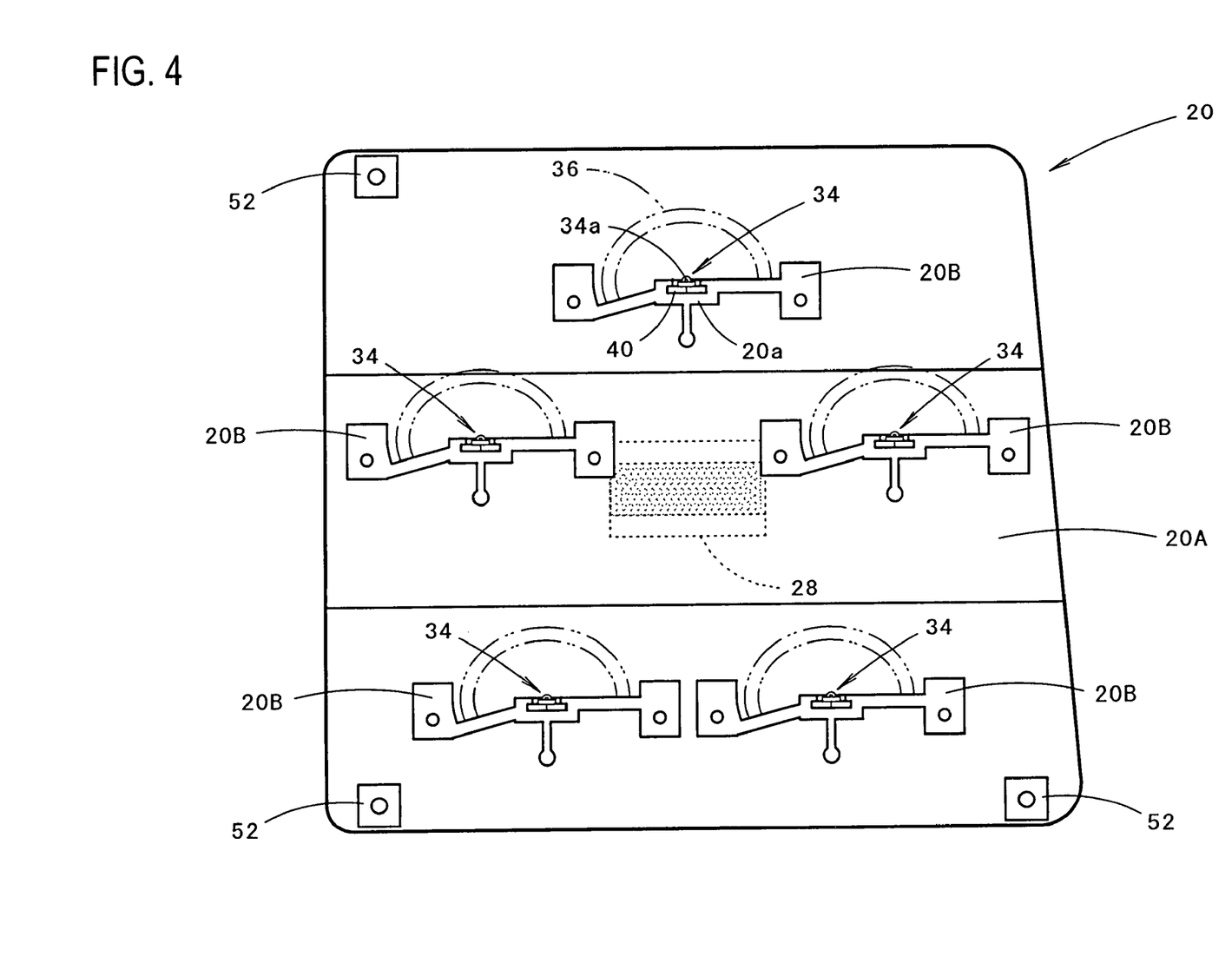
FIG. 4 is a front view of the metal bracket in the vehicular lamp.

FIG. 4 is a front view of the metal bracket 20.

As shown in the drawing, the metal bracket 20 is configured with a die-cast product (for example, an aluminum die-cast product or the like). The metal bracket 20 includes a vertical panel portion 20A that is formed in a stepped configuration and five unit attachment portions 20B that extend from the vertical panel portion 20A toward the front in the manner of shelves.

The five unit attachment portions 20B are arranged so as to be positioned in the proximity of the vertexes of an equilateral pentagon, in a frontal view of the lamp. One of the five unit attachment portions 20B is provided on the top vertical portion of the vertical panel portion 20A. Other two of the five unit attachment portions 20B are provided on the middle vertical portion of the vertical panel portion 20A. The remaining two of the five unit attachment portions 20B are provided on the bottom vertical portion of the vertical panel portion 20A.

The lamp units 30 are fixed onto the metal bracket 20 at the unit attachment portions 20B. In this configuration, the lamp units 30 are arranged so that the optical axes Ax thereof extend in parallel to one another in the direction that is orthogonal to the vertical panel portion 20A. However, it should be noted that, typically when the optical axis adjustment by the aiming mechanism 18 is completed, the optical axes Ax of the lamp units 30 are arranged so as to extend in a downward direction by approximately 0.5 degrees to 0.6 degrees with respect to the vehicular longitudinal direction.

Each of the lamp units 30 includes a projection lens 32 that is provided on the optical axis Ax, a light emitting element 34 that is provided on the rear side of the projection lens 32, a reflector 36 that is provided so as to cover the light emitting element 34 from the upper side, and a light controlling member 38 that is provided between the light emitting element 34 and the projection lens 32.

The projection lens 32 is a lens that is made of a transparent resin. The projection lens 32 is configured with a planoconvex aspherical lens in which the front side surface is convex, and the rear side surface is flat.

The light emitting element 34 is a white light-emitting diode that includes a light emitting chip 34a. The light emitting element 34 is supported by a supporting plate 40 that is in the shape of an equilateral hexagon and is made of metal. The light emitting element 34 is fixed onto the unit attachment portion 20B of the metal bracket 20, while being arranged vertically upward in such a manner that the central position of the light emitting element 34 is positioned on the optical axis Ax. This fixation of the light emitting element 34 onto the unit attachment portion 20B is realized by press-fitting, from the front side, the supporting plate 40 into a recessed groove 20a that is formed on the upper surface of the unit attachment portion 20B. With this arrangement, even if the light emitting elements 34 generate heat when the lamp units 30 are lit, it is possible to allow the heat to move to the metal bracket 20 promptly via the supporting plates 40 by thermal conduction.

The reflector 36 is configured so that the light emitted from the light emitting element 34 is reflected in the forward direction towards the optical axis Ax so as to be substantially converged in the proximity of a rear side focal point F of the projection lens 32. To be more specific, the reflective surface 36a of the reflector 36 has a cross-section which includes the optical axis Ax and is generally ellipsoidal in shape. The ellipsoidal shape is arranged so that the eccentricity gradually increases from the vertical cross section toward the horizontal cross section. The reflective surface 36a makes the light emitted from the light emitting element 34 substantially converge at a position slightly to the front of the rear side focal point F.

A pair of brackets on the right and the left is provided with the reflector 36. By the pair of brackets, the reflector 36 is fixed onto the metal bracket 20 with screws, while the peripheral edge lower portion of the reflector 36 abuts against the upper surface of the unit attachment portion 20B of the metal bracket 20.

The light controlling member 38 is formed so that the upper surface 38a thereof extends rearward from the rear side focal point F of the projection lens 32. The front-end edge 38a1 is formed in a generally arc shape along the focal plane of the rear side focal point F of the projection lens 32.

The upper surface 38a of the light controlling member 38 is in a generally inverted V-shape in a frontal view of the lamp. In other words, the upper surface 38a is configured so that the area on the left side (i.e., the right side in the frontal view of the lamp) of the optical axis Ax is structured with a plane that extends from the optical axis Ax horizontally toward the left, whereas the area on the right side of the optical axis Ax is structured with a plane that extends from the optical axis Ax obliquely downward (for example, downward by 15 degrees) toward the right. A reflective surface processing with aluminization, for example, is applied to the upper surface 38a. Accordingly, the upper surface 38a is configured to be a reflective surface that prevents part of the reflected light from the reflective surface 36a of the reflector 36 from traveling straight, so that it is reflected upward.

The light controlling member 38 is formed so that the front end portion thereof is curved toward the bottom side. The projection lens 32 is fixed and supported by the front-end edge of the light controlling member 38.

A pair of brackets on the right and the left is formed on the rear end portion of the light controlling member 38. By the pair of brackets, the light controlling member 38 is fixed onto the unit attachment portion 20B with screws. This fixation with the screws is realized by tightening the light controlling member 38 and the reflector 36 together while having a resilient bushing 42 interposed between the brackets and the unit attachment portion 20B.

The lamp body 12 is configured so as to include a lamp main body 22 that is made of a synthetic resin and a heat sink 24 that serves as the metal member.

The lamp main body 22 is provided, in a rear face wall 22a thereof, with an opening 22b that has a rectangular shape. The heat sink 24 is fitted and attached to the opening 22b via a gasket 26. The heat sink 24 includes a panel portion 24A that is arranged so as to close up the opening 22b from the inside of the lamp main body 22 and a plurality of heat releasing fins 24B that protrude rearward from the panel portion 24A via the opening 22b, into the space outside the lamp. In this arrangement, the plurality of heat releasing fins 24B are arranged so as to form longitudinal stripes in the substantially entire area of the panel portion 24A.

A flexible heat pipe 28 that serves as a member that has flexibility and has high thermal conductivity is provided between the panel portion 24A of the heat sink 24 and the vertical panel portion 20A of the metal bracket 20. In one specific example, the flexible heat pipe 28 is a flexible heat pipe that is formed in a band shape and has a thickness of approximately 1 millimeter. The flexible heat pipe 28 is arranged so as to be in an S shape on its side, in a side view of the lamp. At the front end portion and the rear end portion thereof, the flexible heat pipe 28 is fixed onto the rear surface of the middle vertical portion of the vertical panel portion 20A and the front surface of the panel portion 24A. This fixation of the front and the rear end portions is realized by adhesion using an adhesive having thermal conductivity.

Figure 5:
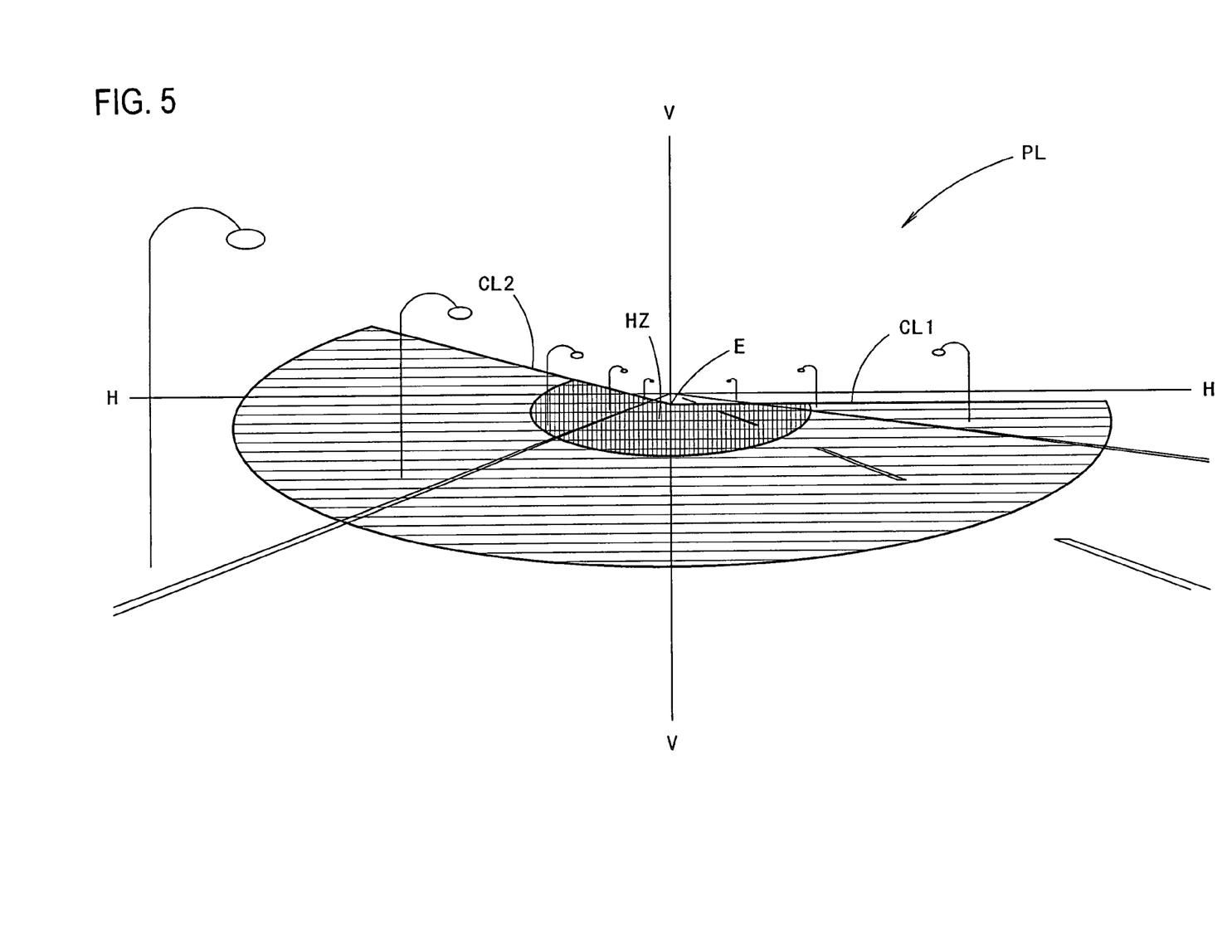
FIG. 5 is a perspective view showing a low-beam distribution pattern that is formed on an imaginary vertical screen positioned 25 meters away from the lamp to the front, by the light irradiated from the vehicular lamp.

FIG. 5 is a drawing that shows, in a perspective manner, a low-beam distribution pattern that is formed on an imaginary vertical screen positioned 25 meters away from the lamp to the front, by the light irradiated forward from the vehicular lamp 10 according to the present embodiment.

As shown in the drawing, the low-beam distribution pattern PL is a light distribution pattern for left-side light distribution. The low-beam distribution pattern PL is formed as a combined light distribution pattern in which the five light distribution patterns formed by the light irradiated from the five lamp units 30 are combined.

The low-beam distribution pattern PL has, on the upper end edge, a horizontal cut-off line CL1 and an oblique cut-off line CL2 that rises from the horizontal cut-off line CL1 at a predetermined angle (for example, 15 degrees). An elbow point E, which is the intersection point of the two cut-off lines CL1 and CL2, is arranged to be at a position that is below H-V by approximately 0.5 degrees to 0.6 degrees and is at the vanishing point in the forward direction of the lamp. In the low-beam distribution pattern PL, a hot zone HZ, which is an area of high-intensity light, is formed so as to surround the elbow point E.

In the low-beam distribution pattern PL, the elbow point E is at a position that is below H-V by approximately 0.5 degrees to 0.6 degrees because the optical axes Ax of the lamp units 30 extend in a downward direction by approximately 0.5 degrees to 0.6 degrees with respect to an axial line that extends in the vehicular longitudinal direction. As explained above, the optical axis adjustment is performed by tilting the metal bracket 20 in the up-and-down direction and in the right-and-left direction, using the aiming mechanism 18. With this arrangement, the positional relationship between the two ends of the flexible heat pipe 28 changes due to the tilting of the metal bracket 20. However, because the flexible heat pipe 28 has flexibility, the change in the positional relationship is allowed for by transformation of the shape of the flexible heat pipe.

As explained in detail so far, in the vehicular lamp 10 according to the present embodiment, the five lamp units 30 that use the light emitting elements 34 as the light sources and the metal bracket 20 that supports the five lamp units 30 are housed inside the lamp chamber that is formed by the lamp body 12 and the translucent cover 14 attached to the front-end opening 12a of the lamp body 12. Also, the metal bracket 20 is tiltably supported by the lamp body 12. A part of the lamp body 12 is configured with the heat sink 24, which serves as the metal member. The heat sink 24 and the metal bracket 20 are connected to each other by the flexible heat pipe 28, which serves as the member that has flexibility and has high thermal conductivity. Thus, it is possible to achieve the effects below.

When the lamp units 30 are lit, the heat generated by the light emitting elements 34 moves to the metal bracket 20 having a large heat capacity, due to thermal conduction. Also, the heat further moves to the heat sink 24 via the flexible heat pipe 28. In this situation, because the heat sink 24 is configured as a part of the lamp body 12, which is a member exposed to the space outside the lamp chamber, the heat that has been conducted to the heat sink 24 is released into the space outside the lamp chamber. As a result, it is possible to improve the heat releasing performance of the lamp.

In addition, because the flexible heat pipe 28 that connects the heat sink 24 and the metal bracket 20 to each other has flexibility, even when the metal bracket 20 is tilted, it is possible to easily maintain the water-proof function of the lamp without hindering the movement of the metal bracket 20. Thus, it is possible to prevent the configuration of the lamp from becoming complicated.

As explained so far, according to the present embodiment, with the vehicular lamp 10 that includes the five lamp units 30 that use the light emitting elements 34 as the light sources, it is possible to improve the heat releasing performance of the vehicular lamp 10 without making the configuration of the lamp complicated. Also, according to the present invention, it is possible to effectively inhibit the temperature rise in the light emitting elements 34 that are included in the lamp units 30. It is also possible to effectively inhibit a reduction in the light flux from the light sources and changes in the light emission colors.

In particular, according to the present embodiment, the member that has high thermal conductivity and connects the heat sink 24 and the metal bracket 20 to each other is configured with the flexible heat pipe 28. Thus, due to the thermal transport function of the flexible heat pipe 28, the thermal conduction from the metal bracket 20 to the heat sink 24 is efficiently achieved. In addition, because the flexible heat pipe 28 is formed in a band shape, it is possible to place the flexible heat pipe 28 easily in the small space between the vertical panel portion 20A in the metal bracket 20 and the panel portion 24A in the heat sink 24.

Further, according to the present embodiment, the lamp body 12 is configured so as to include the lamp main body 22 that has, in the rear face wall 22a thereof, the opening 22b and the heat sink 24 that is attached to the opening 22b. Further, the heat sink 24 is configured so as to include the panel portion 24A that is arranged so as to close up the opening 22b in the lamp main body 22 and the plurality of heat releasing fins 24B that extend rearward from the panel portion 24A. Thus, it is possible to efficiently release the heat that has been conducted to the heat sink 24 into the space outside the lamp chamber.

Furthermore, according to the present embodiment, the light emitting elements 34 in the lamp units 30 are attached directly to the metal bracket 20. With this arrangement, it is possible to allow the heat generated by the light emitting elements 34 to move to the metal bracket 20 promptly. Thus, it is possible to enhance the heat releasing performance of the light emitting elements 34.

In the description of the first embodiment, the five lamp units 30 are arranged such that they form a substantially equilateral pentagon. However, it is possible to employ the lamp units 30 in a different quantity or different arrangement. The same applies to the other embodiments of the invention that will be described later.

Additionally, in the description of the first embodiment, the five lamp units 30 are configured as projector-type lamp units. However, it is possible to employ other configurations of the lamps, too. The same applies to the other embodiments of the invention that will be described later.

Further, the vehicular headlamp 10 according to the first embodiment has the configuration in which the metal bracket 20 is supported by the lamp body 12 via the aiming mechanism 18, in such a manner that the metal bracket 20 is tiltable in the up-and-down direction and in the right-and-left direction, so that optical axis adjustment can be performed. However, in headlamps and the like, a lamp configuration that includes a leveling function or a swivel function (i.e., a function that allows the metal bracket 20 to rotate by a large angle in the right-and-left direction with respect to the lamp body 12), aside from the optical axis adjustment function, has been frequently employed. Even with such a lamp configuration, when the lamp is configured so as to include the flexible heat pipe 28, such as in the first embodiment, it is possible to maintain the water-proof function of the lamp without hindering the movement of the metal bracket 20, even if the metal bracket 20 is tilted by the leveling function or the swivel function. The same applies to the other embodiments of the invention that will be described later.

Next, a second embodiment of the present invention will be explained.

Figure 6:
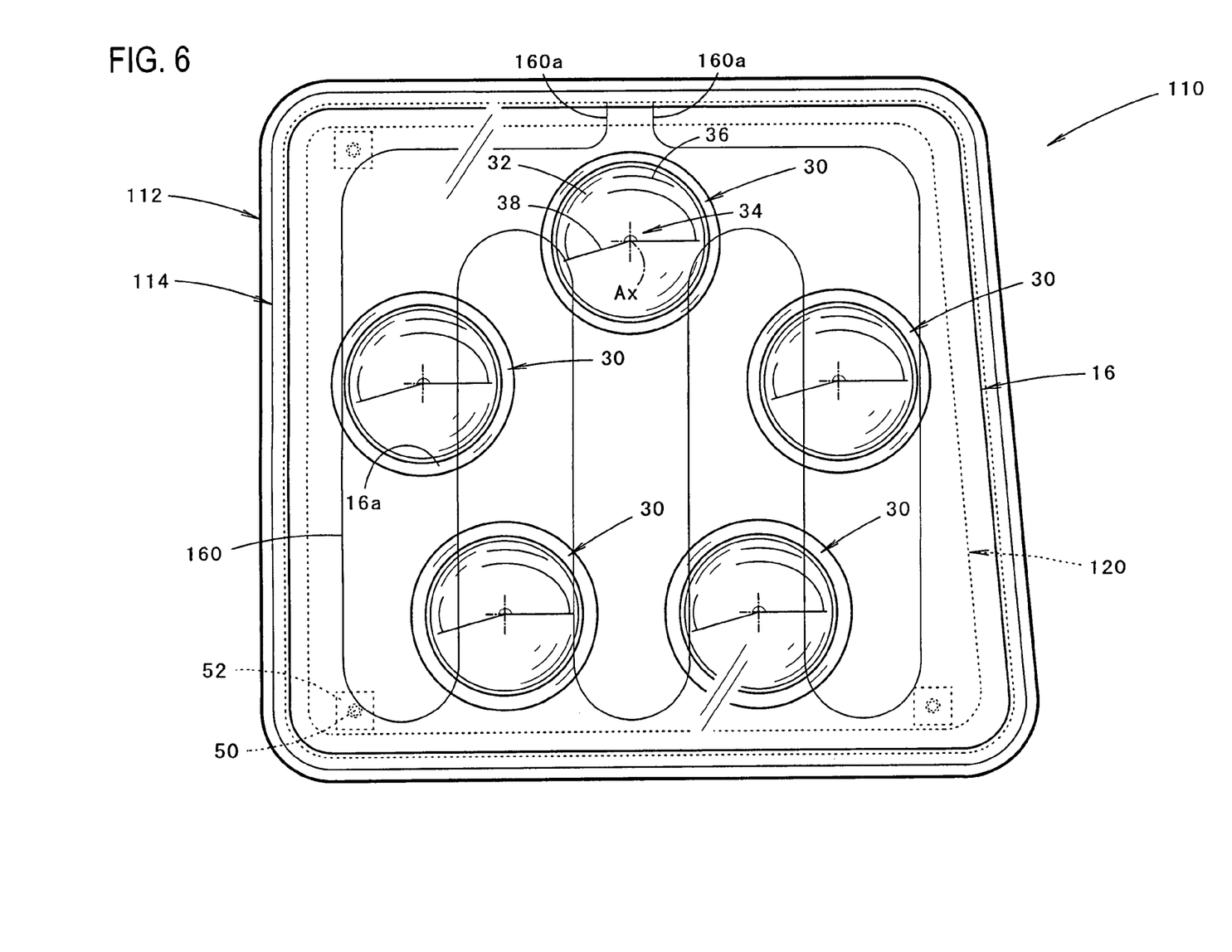
FIG. 6 is a front view of the vehicular lamp according to a second embodiment of the present invention.
Figure 7:
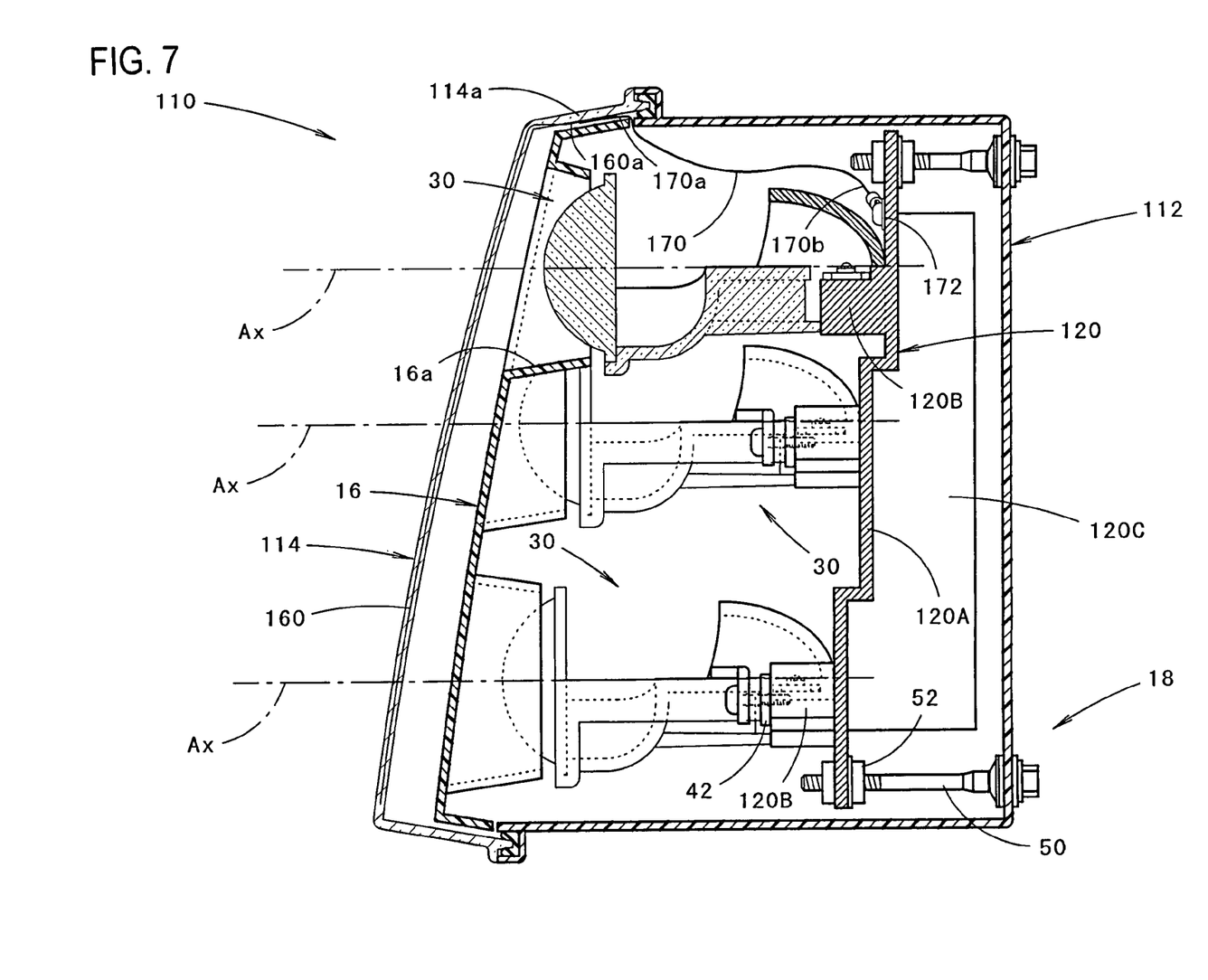
FIG. 7 is the same type of drawing as FIG. 2, which shows the vehicular lamp according to the second embodiment.

FIG. 6 is a front view of a vehicular headlamp 110 according to the present embodiment. FIG. 7 is the same type of drawing as FIG. 2, which shows the vehicular headlamp 110.

As shown in these drawings, the basic configuration of the vehicular headlamp 110 is the same as the one in the first embodiment. However, the configurations of the metal member and the member having high thermal conductivity are different from the ones according to the first embodiment. Accordingly, the configurations of a lamp body 112, a translucent cover 114, and a metal bracket 120 are also partially different from the configurations of the lamp body 12, the translucent cover 14, and the metal bracket 20 according to the first embodiment.

To be more specific, according to the present embodiment, the metal member is configured with a metal wire 160 that is embedded in the translucent cover 114.

The metal wire 160 is embedded in substantially the entire area of the translucent cover 114 in a predetermined wiring pattern. At the central upper end portion of the translucent cover 114, the two end portions 160*a* of the metal wire 160 are exposed to the internal surface of the peripheral face wall 114*a* of the translucent cover 114. In one specific example, the metal wire 160 is configured with a copper wire having a diameter of approximately 30 μm to 80 μm.

Figure 8:
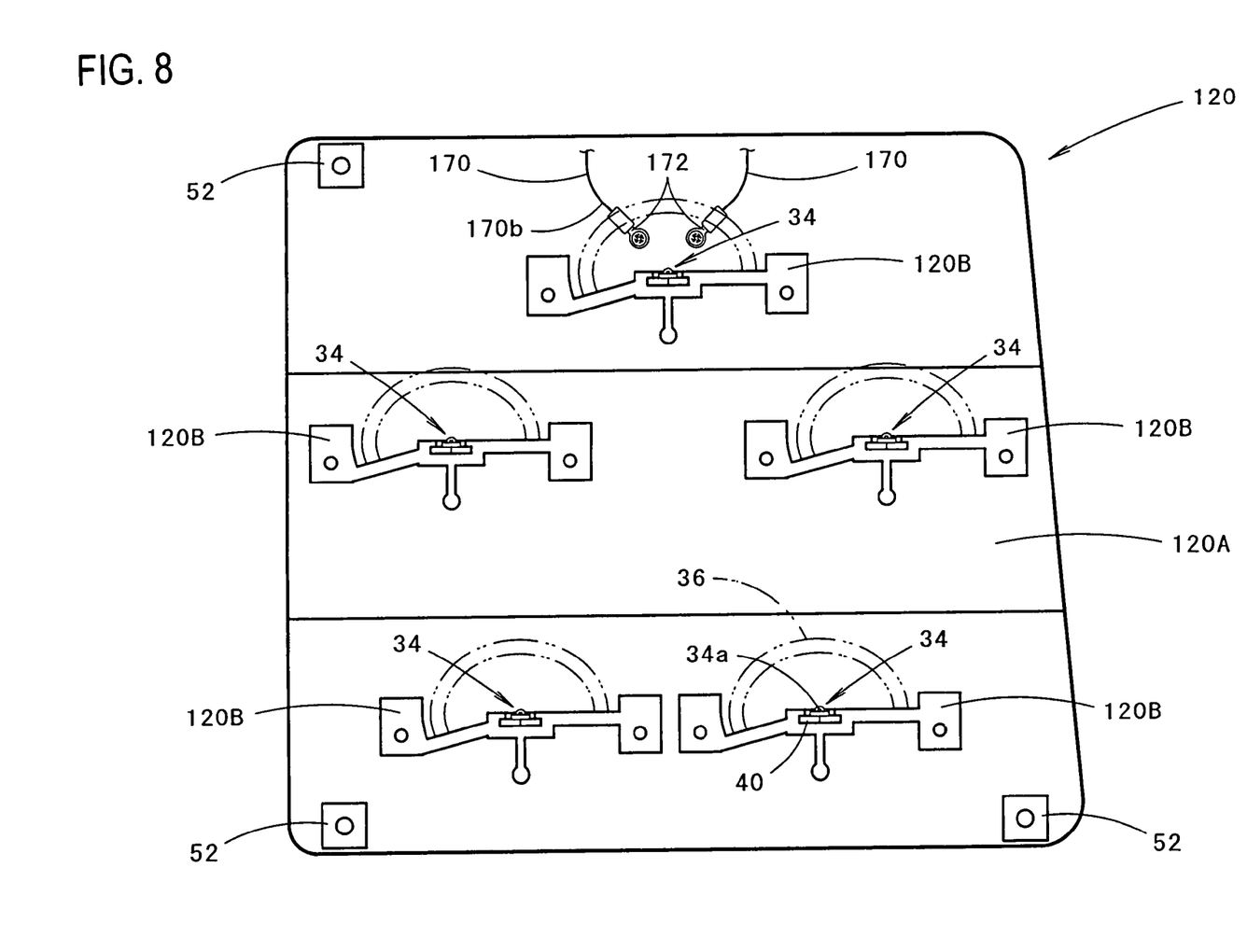
FIG. 8 is a front view of the metal bracket in the vehicular lamp according to the second embodiment.

FIG. 8 is a front view of the metal bracket 120.

As shown in the drawing, according to the present embodiment, the member having high thermal conductivity is configured with a pair of metal wires 170.

The metal wires 170 are configured with a copper wire having flexibility. The front end portions 170*a* of the metal wires 170 are connected to the end portions 160*a* of the metal wire 160, respectively. The rear end portions 170*b* of the metal wires 170 are connected to the metal bracket 120. In this configuration, the metal wires 170 are arranged so as to be loose to some extent.

The connection between the front end portions 170*a* of the metal wires 170 and the two end portions 160*a* of the metal wire 160 is realized by adhesion using an adhesive having thermal conductivity.

The connection between the rear end portions 170*b* of the metal wires 170 and the metal bracket 120 is realized by attaching a metal eyelet 172 to each of the rear end portions 170*b* of the metal wires 170 and fixing the metal eyelet 172 to a vertical panel portion 120A included in the metal bracket 120 with screws in such a manner that the metal eyelet 172 is in plane-contact with the front surface of the vertical panel portion 120A. In this situation, the positions at which the metal eyelet 172 is fixed onto the vertical panel portion 120A are arranged so as to be in the proximity of a position above a unit attachment portion 120B in the top vertical portion of the vertical panel portion 120A.

The metal bracket 120 according to the present embodiment is configured, like the metal bracket 20 according to the first embodiment, so as to include a vertical panel portion 120A and five unit attachment portions 120B. However, the metal bracket 120 further includes a plurality of heat releasing fins 120C that protrude rearward from the vertical panel portion 120A. The plurality of heat releasing fins 120C are arranged so as to form longitudinal stripes in the substantially entire area of the vertical panel portion 120A and thereby enable the metal bracket 120 to function as a heat sink.

Although the lamp body 12 according to the first embodiment has the configuration in which the heat sink 24 is attached to the opening 22*b* that is provided in the rear face wall 22*a* of the lamp main body 22, the lamp body 112 according to the present embodiment does not have the same configuration.

In the vehicular headlamp 110 according to the present embodiment, when the lamp units 30 are lit, the heat generated by the light emitting elements 34 moved to the metal bracket 120 having a large heat capacity, due to thermal conduction. Also the heat further moves to the metal wire 160 via the pair of metal wires 170. In this situation, because the metal wire 160 is configured so as to be a part of the translucent cover 114, which is a member exposed to the space outside the lamp chamber, the heat which has been conducted to the metal wire 160 is released into the space outside the lamp chamber. Thus, it is possible to improve the heat releasing performance of the lamp.

Further, the metal wires 170 that connect the metal wire 160 and the metal bracket 120 to each other have flexibility and are also arranged so as to be loose to some extent. Thus, even when the metal bracket 120 is tilted, it is possible to easily maintain the water-proof function of the lamp without hindering the movement of the metal bracket 120. Thus, it is possible to prevent the configuration of the lamp from being complicated.

As explained so far, according to the present embodiment, with the vehicular lamp 110 that includes the five lamp units 30 using the light emitting elements 34 as the light sources, it is possible to improve the heat releasing performance of the vehicular lamp 110 without making the configuration of the lamp complicated. Also, with this arrangement, it is possible to effectively inhibit the temperature rise in the light emitting elements 34 that are included in the lamp units 30. It is also possible to effectively inhibit a reduction in the light flux from the light sources and to effectively inhibit changes in the light emission colors.

In particular, according to the present embodiment, the metal member is configured with the metal wire 160 that is embedded in the translucent cover 114 in the predetermined wiring pattern. Thus, it is possible to make the space outside the lamp chamber, into which the heat conducted to the metal wire 160 is released, an outside space of the vehicle body. Accordingly, it is possible to further improve the heat releasing performance of the lamp. In addition, because the vehicular headlamp 110 is a headlamp, wind blows onto the translucent cover 114 while the vehicle is running. Thus, it is possible to further improve the heat releasing performance of the lamp. Additionally, it is also possible to expect that the heat supplied by the metal wire 160 produces an antifogging effect for fogging that may occur on the internal surface of the translucent cover 114 and a snow melting effect for snow that may be stuck on the external surface of the translucent cover 114.

In the description of the second embodiment, the metal wire 160 and the metal wires 170 are configured with copper wires. However, it is acceptable to use other wires, such as aluminum alloy wires or tungsten wires, instead of the copper wires. The same applies to the other embodiment of the invention that is described later.

According to the second embodiment, the metal wires 170 are arranged so as to be loose to some extent. However, it is acceptable to form portions of the metal wires 170 into a coil spring shape. In this case, it is possible to arrange the metal wires 170 without looseness. Further, it is acceptable to use a metal foil instead of the pair of metal wires 170. In this case, the metal foil may be formed, for example, into an accordion-pleated shape.

Next, a third embodiment of the present invention will be explained.

Figure 9:
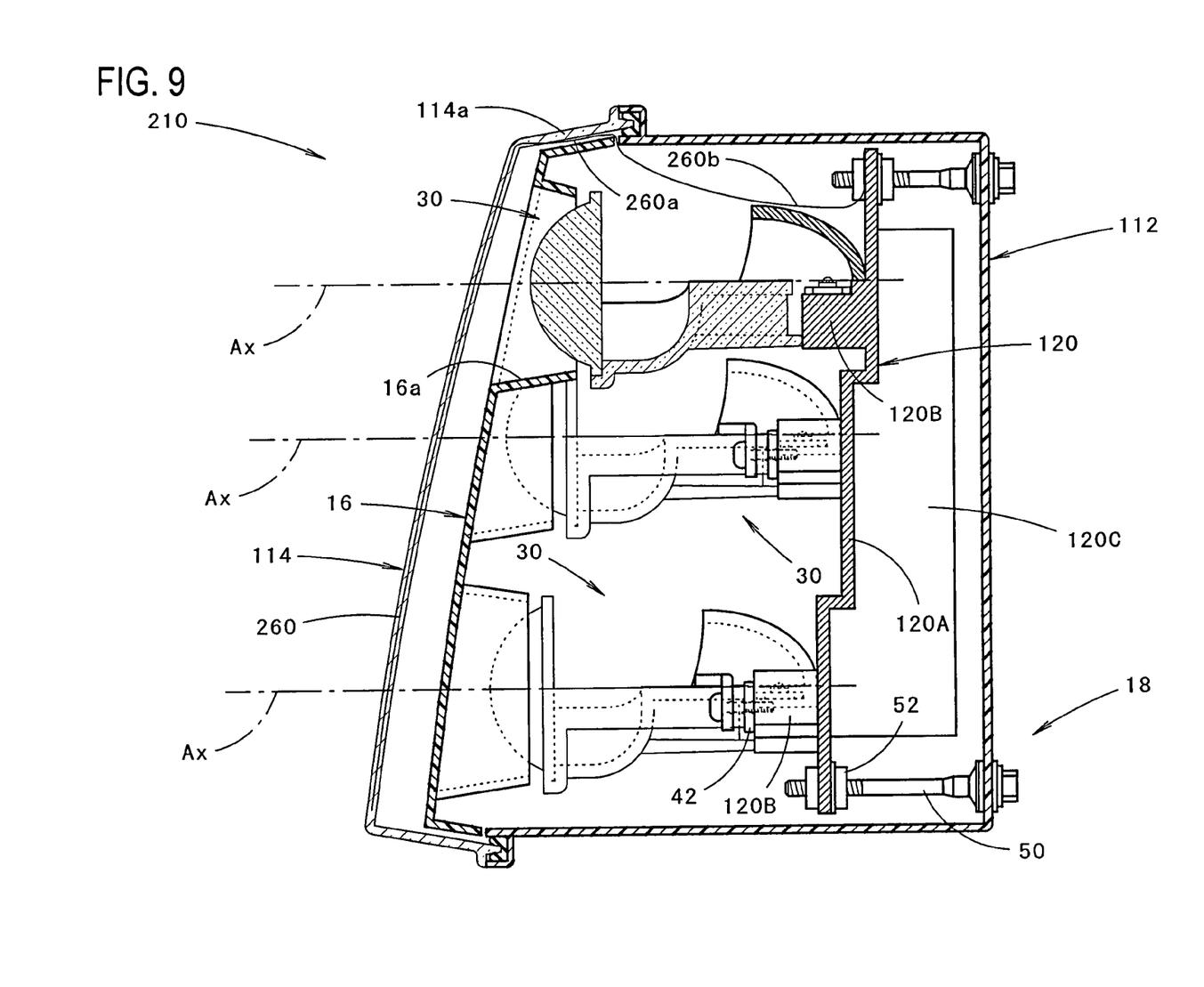
FIG. 9 is the same type of drawing as FIG. 2, which shows the vehicular lamp according to a third embodiment.

FIG. 9 is the same type of drawing as FIG. 2 and shows a vehicular headlamp 210 according to the present embodiment.

As shown in the drawing, the basic configuration of the vehicular headlamp 210 is the same as the one in the second embodiment. However, the configurations of the metal member and the member having high thermal conductivity are different from the ones according to the second embodiment.

To be more specific, according to the present embodiment, a metal wire 260 with which the metal member is configured is embedded in the substantially entire area of the translucent cover 114 in a predetermined wiring pattern, like the metal wire 160 according to the second embodiment. At the central upper end portion of the translucent cover 114, two end portions 260*a* of the metal wire 260 are exposed to the internal surface of the peripheral face wall 114*a* of the translucent cover 114; however, the two end portions 260*a* of the metal wire 260 according to the present embodiment extend out of the translucent cover 114 for predetermined lengths. The pair of extending portions 260*b* of the metal wire 260 serves as the member having high thermal conductivity.

In this situation, the extending portions 260*b* are arranged so as to be loose to some extent. The connection between the extending portions 260*b* and the metal bracket 120 is realized by adhesion using an adhesive having thermal conductivity.

When the configuration according to the present embodiment is adopted, it is also possible to achieve the same effects as in the second embodiment.

In addition, when the configuration according to the present embodiment is adopted, it is possible to reduce the number of parts being used. As a result, it is possible to further simplify the configuration of the lamp.

In the third embodiment, the extending portions 260*b* are arranged so as to be loose to some extent. However, it is also acceptable to form parts of the extending portions 260*b* into a coil spring shape. In this case, it is acceptable to arrange the extending portions 260*b* without looseness. Further, other shapes and configurations may be used for the extending portions 260*b*.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

[Description of the Reference Numerals]
10, 110, 210 VEHICULAR LAMP
12, 112 LAMP BODY
12*a* FRONT-END OPENING
14, 114 TRANSLUCENT COVER
16 INNER PANEL
16*a* CYLINDRICAL OPENING
18 AIMING MECHANISM
20, 120 METAL BRACKET
20A, 120A VERTICAL PANEL PORTION
20B, 120B UNIT ATTACHMENT PORTION
20*a* RECESSED GROOVE
22 LAMP MAIN BODY
22*a* REAR FACE WALL
22*b* OPENING
24 HEAT SINK (METAL MEMBER)
24A PANEL PORTION
24B, 120C HEAT RELEASING FIN
26 GASKET
28 FLEXIBLE HEAT PIPE (MEMBER HAVING HIGH THERMAL CONDUCTIVITY)
30 LAMP UNITS
32 PROJECTION LENS
34 LIGHT EMITTING ELEMENT
34*a* LIGHT EMITTING CHIP
36 REFLECTOR
36*a* REFLECTIVE SURFACE
38 LIGHT CONTROLLING MEMBER
38*a* UPPER SURFACE
38*a*1 FRONT-END EDGE
40 SUPPORTING PLATE
42 RESILIENT BUSHING
50 AIMING SCREW
52 AIMING NUT
114*a* PERIPHERAL FACE WALL
160, 260 METAL WIRE (METAL MEMBER)
160*a*, 260*a* TWO END PORTIONS
170 METAL WIRE (MEMBER HAVING HIGH THERMAL CONDUCTIVITY)
170*a* FRONT END PORTION
170*b* REAR END PORTION
172 METAL EYELET
260*b* EXTENDING PORTION (MEMBER HAVING HIGH THERMAL CONDUCTIVITY)
Ax OPTICAL AXIS
CL1 HORIZONTAL CUT-OFF LINE
CL2 OBLIQUE CUT-OFF LINE
E ELBOW POINT
F REAR SIDE FOCAL POINT
HZ HOTZONE
PL LOW-BEAM DISTRIBUTION PATTERN

What is claimed is:

1. A vehicular lamp comprising:
    a plurality of lamp units that use light emitting elements as light sources and a metal bracket that supports the plurality of lamp units, wherein the plurality of lamp units and the metal bracket are housed in a lamp chamber formed by a lamp body and a translucent cover that is attached to a front-end opening of the lamp body,
    wherein the metal bracket is tiltably supported by the lamp body, wherein one of a portion of the lamp body and a portion of the translucent cover is configured with a metal member,
    wherein the metal member and the metal bracket are connected to each other by a flexible heat pipe member having flexibility and high thermal conductivity, whose shape transforms due to the positional relationship between the metal member and the metal bracket, and
    wherein the vehicular lamp has a waterproof function without hindering the movement of the metal bracket, and transfers heat outside the lamp chamber while maintaining the waterproof function.

2. The vehicular lamp according to claim 1,
    wherein the lamp body comprises:
    a lamp main body having an opening in a rear face wall thereof; and
    the metal member attached to the opening in the lamp main body, and
    wherein the metal member comprises:
    a panel portion that is arranged so as to close up the opening in the lamp main body; and a plurality of heat releasing fins that extend rearward from the panel portion.

3. The vehicular lamp according to claim 1, wherein the metal member is configured with a metal wire that is embedded in the translucent cover in a predetermined wiring pattern.

4. The vehicular lamp according to claim 3, wherein two end portions of the metal wire extend out of the translucent cover for predetermined lengths, and the member having high thermal conductivity is configured with the pair of extending portions of the metal wire.

5. The vehicular lamp according to claim 1, wherein the light emitting elements in the lamp units are attached directly to the metal bracket.

6. The vehicular lamp according to claim 2, wherein the light emitting elements in the lamp units are attached directly to the metal bracket.

7. The vehicular lamp according to claim 3, wherein the light emitting elements in the lamp units are attached directly to the metal bracket.

8. The vehicular lamp according to claim 4, wherein the light emitting elements in the lamp units are attached directly to the metal bracket.

9. The vehicular lamp according to claim 1, wherein the flexible heat pipe has a band shape.

10. The vehicular lamp according to claim 4, wherein the pair of extending portions of the metal wire are each in a coil spring shape.

11. The vehicular lamp according to claim 1, further comprising:
an aiming mechanism that adjusts the positional relationship between the metal member and the metal bracket based on at least one of leveling function and a swivel function.

* * * * *